US 6,625,018 B1

(12) United States Patent
Augustin et al.

(10) Patent No.: US 6,625,018 B1
(45) Date of Patent: Sep. 23, 2003

(54) FLUID-FLOW BALANCER, ELECTRONIC SYSTEM AND RELATED METHODS

(75) Inventors: Thomas J. Augustin, El Dorado Hills, CA (US); Stephan Karl Barsun, Auburn, CA (US); Christopher Gregory Malone, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/183,151

(22) Filed: Jun. 26, 2002

(51) Int. Cl.[7] ................................................. H05K 7/20
(52) U.S. Cl. ........................ 361/690; 361/692; 361/719; 165/80.3; 312/223.2
(58) Field of Search ........................ 361/678, 690–695, 361/719–721; 174/16.1, 16.3, 15.1; 165/80.3, 122, 104.33; 454/184

(56) References Cited

U.S. PATENT DOCUMENTS

| | | | | |
|---|---|---|---|---|
| 4,399,485 A | * | 8/1983 | Wright et al. ............... 361/693 |
| 5,684,674 A | * | 11/1997 | Yin .............................. 361/695 |
| 5,690,306 A | * | 11/1997 | Roesner .................. 248/222.52 |
| 5,914,858 A | * | 6/1999 | McKeen et al. ............. 361/695 |
| 5,940,266 A | * | 8/1999 | Hamilton et al. ........... 361/695 |
| 6,018,458 A | * | 1/2000 | Delia et al. .................. 361/690 |
| 6,252,161 B1 | * | 6/2001 | Hailey et al. .............. 174/35 R |
| 6,449,150 B1 | * | 9/2002 | Boone ......................... 361/694 |
| 6,483,700 B1 | * | 11/2002 | Malone et al. .............. 361/690 |

* cited by examiner

Primary Examiner—Boris Chervinsky

(57) ABSTRACT

A fluid-flow balancer mimics the air-flow resistance of a component omitted from an electronic system so that omission causes little or no disruption to or alteration of the flow of a cooling fluid. This prevents overheating that such disruption or alteration may otherwise cause. In addition, the fluid-flow balancer may also mimic the EMI suppression characteristics of the omitted component. Thus, a system not fully populated with components can still be adequately cooled and shielded without changing the cooling or shielding systems.

16 Claims, 3 Drawing Sheets

FLUID-FLOW BALANCER, ELECTRONIC SYSTEM AND RELATED METHODS

BACKGROUND OF THE INVENTION

Electronic systems, such as computers typically include a protective case, one or more circuit boards mounted inside the case, and one or more components such as a processor or a power supply mounted to each of the boards. In operation, the components generate heat that the system must remove from the case to prevent overheating and the damage it may cause.

To remove the heat, the system typically includes one or more fans that draw cool air into the case, circulate the drawn air within the case such that it absorbs the heat generated by the components, and expel the heated air from the case. The rate at which the heat is removed is typically proportional to the rate at which the air flows into and out of the case. The greater the flow rate, the greater the heat-removal rate and vice versa.

To prevent hot spots within the case, however, the system designer typically must consider the size, location, and orientation of the boards and components when designing the cooling system. The boards and components add resistance to the airflow paths within the case. Because the air will follow the paths of least resistance, components that lie along high-resistance paths may overheat if the cooling system is not designed to provide adequate flow rates along these high-resistance paths. Therefore, the designer analyzes the layout of the boards and components and determines the size, speed, and placement of the cooling fans that will provide adequate flow rates along all of the airflow paths for the lowest cost. Factors that affect the cost of the cooling system include the number of fans, the amount of power they consume, and how difficult it is to manufacture/install the cooling system.

Furthermore, to keep electromagnetic interference (EMI) to an acceptable level, the designer typically must consider the layout of the boards and components within the case when designating an EMI shielding system.

To take advantage of the economies of scale in mass production, most models of a system include the same cooling and shielding systems, but may include different circuit boards or components. For example, a high-end model of a data server may include a mother board with four processors mounted thereto, while a low-end model of the same server might include the same board with only one processor mounted thereto. To ensure that a system that includes all of the possible boards and components is properly cooled and shielded the cooling and shielding systems are typically designed for such a fully populated system. Consequently, when one or more of the components or boards are omitted from the system, the airflow and EMI footprint of the system may change such that the cooling system, shielding system, or both are no longer adequate.

FIGS. 1 and 2 illustrate the effect that an omitted component can have on the air flow within an electronic system.

FIG. 1 illustrates an electronic system 20 that includes components 22 and 24 attached to the circuit boards 26, 28 and 30. Air flows along paths 32, 34 and 36 between the circuit boards 26, 28 and 30 to remove heat from the components 22 and 24. Because the cooling system (not shown in FIGS. 1 and 2) is designed for the fully populated system 20, the air flow adequately cools the components 22 and 24.

But, as FIG. 2 illustrates, when the component 24 is removed from the circuit board 28, the air flowing along the path 34 does not encounter the resistance of the omitted component 24. Consequently, assuming the same overall air flow into the case as in FIG. 1, air flow along the path 34 increases and the air flow along the paths 32 and 36 decreases. Consequently, the components 22 on the boards 26 and 30 may overheat. One solution is to increase the overall air flow (e.g. by increasing the fan speed) to a level where the flow along the paths 32 and 34 is sufficient to cool the components 22 on the boards 26 and 30. However, this often increases the amount of power consumed by the cooling system and may reduce the life of the cooling fans. It also may increase costs if a technician has to manually adjust the fan speed of each partially populated system.

Still referring to FIGS. 1 and 2, the omission of the component 24 from a circuit board of an electronics system can change the EMI footprint in a similar manner, and tailoring the EMI shielding for each different system can be prohibitively expensive.

SUMMARY OF THE INVENTION

In one aspect of the invention, a fluid-flow balancer for taking the place of a system component having an air-flow resistance includes a flow-resistance element and a mount. The flow-resistance element is operable to mimic the air-flow resistance of the component, and the mount is operable to mount the flow-resistance member within the system.

By mimicking the air-flow resistance of an omitted component, such a balancer can maintain the flow along the air paths within a system at proper levels without tweaking or redesigning the cooling system. In a related aspect of the invention, the balancer also mimics the EMI suppression provided by the omitted component.

DESCRIPTION OF THE PREFERRED EMBODIMENTS

The following discussion is presented to enable one skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Although air is typically circulated within an electronic system to remove heat generated by components therein, other types of gases or fluids could be used. Consequently, although air, air flow and air-flow resistance are referred to throughout this specification, it is understood that air, air flow and air-flow resistance respectively include any desired type of gas or fluid, gas-flow or fluid-flow, and gas-flow resistance or fluid-flow resistance.

Figure 1:
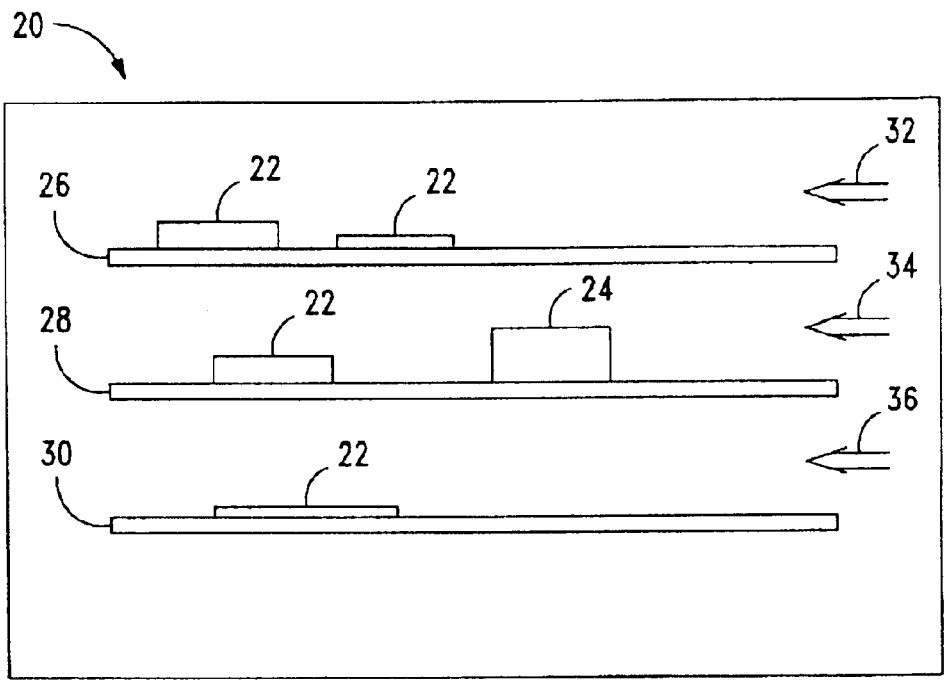
FIG. 1 is a view of an electronic system and the air flow paths over three populated circuit boards.
Figure 2:
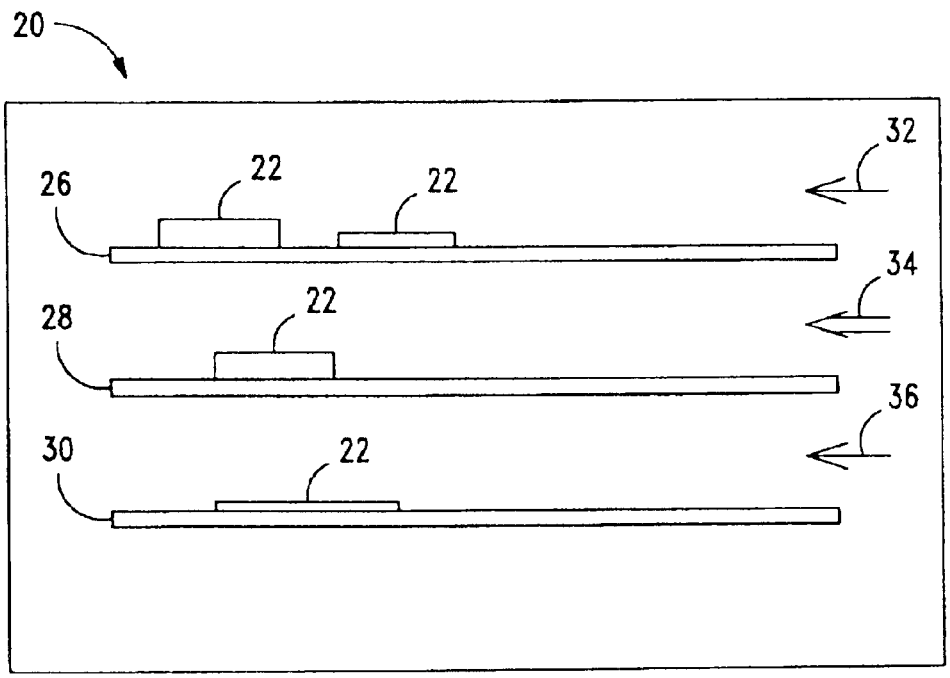
FIG. 2 illustrates the change in air flow over the circuit boards of FIG. 1 when an electronic component is omitted from one of the circuit boards.
Figure 3:
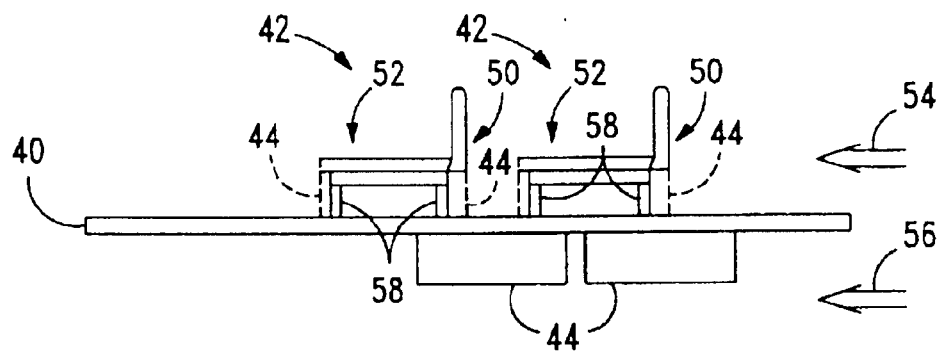
FIG. 3 is a view of a circuit board that incorporates two fluid-flow balancers according to an embodiment of the invention.

FIG. 3 is a side view of a circuit board 40 that includes two fluid-flow balancers 42 according to an embodiment of the invention. Each balancer 42 mimics the air-flow resistance of a respective component 44 (shown in dashed line) that is omitted from the board 40. In addition, each balancer 42 suppresses EMI from other electronic components within the system (FIG. 5) in which the board 40 is installed that would normally be suppressed by the respective omitted components 44. Therefore, the balancers 42 reduce or eliminate changes in the system air flow and EMI shielding caused by the omission of components from the board 40. Consequently, other system components not shown in FIG. 3 remain adequately cooled and shielded.

In one embodiment, the circuit board 40 includes two processing/power supply units 44, and the two fluid-flow balancers 42. The fluid-flow balancers 42 are respectively attached to regions of the circuit board 40 where the additional processing/power-supply units 44 would be attached to populate the circuit board 40, but have been omitted. Such an omission may be for any reason such as a customer (not shown) not needing the extra processing power, and thus not wanting the extra expense, of including four processor/power-supply units 44 on the board 40.

Each fluid-flow balancer 42 includes a flow-resistance member 50 that mimics the air-flow resistance of a processing/power-supply unit 44, and a mount 52 that mounts the flow-resistance member 50 to the circuit board 40. Each flow-resistance member 50 extends in a perpendicular or substantially perpendicular direction relative to the circuit board 40 and into the air flow along the path 54. Thus, the air flow along the path 54 encounters the same or substantially the same flow resistance an air flow along the path 54 would encounter if both processing/power-supply units 44 were mounted to the circuit board 40. Each mount 52 covers or substantially covers the omitted unit's footprint on the circuit board 40 to maintain the system's designed EMI characteristics. Consequently, the air flow along the path 56 is not reduced by the omission, of the units 44, and thus adequately cools the installed units 44 on the underside of the board 40.

Still referring to FIG. 3 in one embodiment, four standoffs 58 (only two shown for each balancer 42) suspend each fluid-flow balancer 42 above the circuit board 40. The standoffs 58 can be sized to suspend each fluid-flow balancer 42 at any desired height above the board 40. For example, the standoffs 58 can be sized to locate each mount 52 to the same or substantially the same height as the top of each omitted processing/power-supply unit 44.

In operation, each fluid-flow balancer 42 resists the air flow along the path 54 to maintain the proper level of air flow along the paths 54 and 56. As discussed in greater detail in conjunction with FIG. 4, the flow-resistance member 50 resists the air flow along the path 54 by obstructing a portion of this air flow and permitting another portion of this air flow to pass unimpeded through the member 50. Without the flow-resistance provided by each fluid-flow balancer 42, the air flow along the path 54 would increase (due to less resistance) and the air flow along the path 56 would decrease and may not adequately cool the processing/power-supply units 44.

Still referring to FIG. 3, other embodiments of the fluid flow balancer 42 are contemplated. For example, the flow-resistance member 50 may extend in a direction that is not perpendicular or substantially perpendicular to the circuit board 40. And although the fluid-flow balancers 42 are attached to a respective region of the circuit board 40 where processor/power-supply units 44 have been omitted, the balancers 42 can be mounted to other regions of the circuit board where a system component has not been omitted. For example, the balancers can be attached to a fully populated circuit board in a region that does not include a component. This may be desirable to alter the designed air flow through all or a portion of the system. In another example, a substitute component may be mounted to a region of the circuit board in place of a system component, and the fluid-flow balancer may be mounted above or adjacent the substitute component. This may be desirable if the substitute component has an air-flow flow resistance that is different than the omitted system component and/or alters the system's EMI characteristics.

Figure 4:
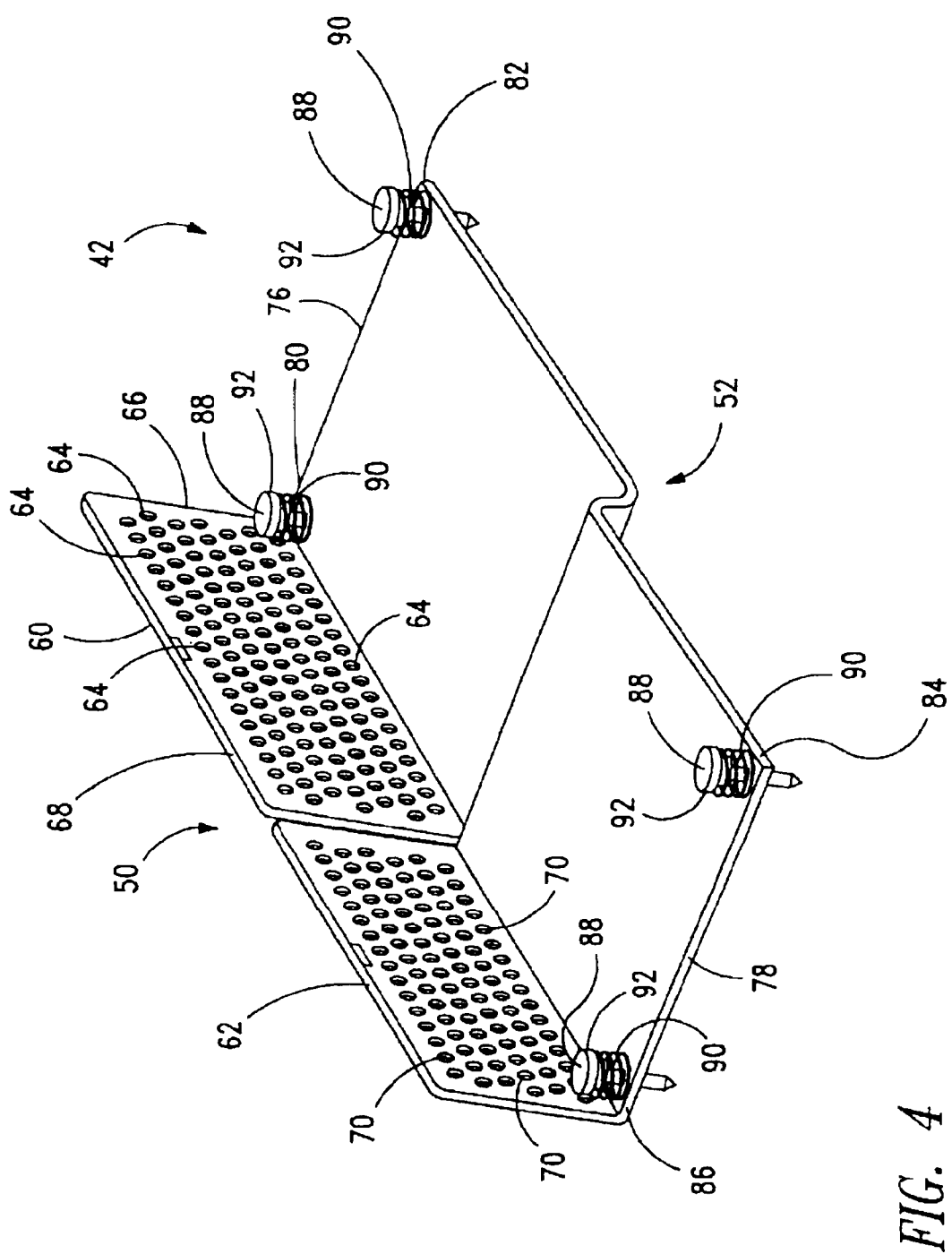
FIG. 4 is a perspective view of one of the fluid-flow balancers of FIG. 3 according to an embodiment of the invention.

FIG. 4 is a perspective view of one of the fluid-flow balancers 42 in FIG. 3 according to an embodiment of the invention. As previously discussed, the fluid-flow balancer 42 includes a flow-resistance member 50 that mimics the air-flow resistance of an omitted component such as a processing/power-supply unit 44 (FIG. 3) and a mount 52 for mounting the flow-resistance member 50 onto the board 40 (FIG. 3).

In one embodiment, the flow-resistance member 50 includes a flow-resistance plate 60 designed to mimic the air-flow resistance of the processor of the unit 44 and another flow-resistance plate 62 designed to mimic the air-flow resistance of the power supply of the unit 44. The flow-resistance plate 60 is flat or substantially flat and includes a plurality of holes 64 arranged in a rectangular pattern. Each hole 64 is the same or substantially the same size and extends through the flow-resistance plate 60 to allow air to flow through the plate 60. The plate 60 has an area equal to the length of a side 68 times the width of an edge 66. The plurality of holes 64 define a hole area that equals the sum of all the individual areas of each hole 64. When the air flow contacts the flow-resistance plate 60 from a direction perpendicular or substantially perpendicular to the plate 60, a portion of the air flows through the holes 64 and another portion of the air is obstructed by the remainder of the plate 60. Thus, the arrangement of the holes 64 in the plate 60 and the ratio of the hole area to the plate area are designed so that the plate 60 mimics the air-flow resistance of the omitted processor. Likewise, the flow-resistance plate 62 includes a plurality of holes 70 arranged in a rectangular pattern. Thus, the arrangement of the holes 70 and the ratio of their area to the area of the plate 62 are designed so that the plate 62 mimics the air-flow resistance of the omitted power supply.

In other embodiments, the flow-resistance plates 60 and 62 can be modified to mimic the air-flow resistance of other electronic components having an air-flow resistance different than the processor and the power supply of the processor/power-supply unit 44 (FIG. 3). For instance, such modifications can include arranging the holes 64 in a pattern other than a rectangular pattern or changing the size of the holes. For example, the flow-resistance plate 60 can include one hole sized as desired or the plate 60 can include regions where holes are clustered together and other regions without a hole. Additionally, such modifications can include changing the ratio of the hole area to the plate area. For example, increasing this ratio decreases the air-flow resistance of the flow-resistance plate and vice-versa.

Other embodiments of the air-flow resistance member 50 are contemplated. For example, although the flow-resistance plates 60 and 62 include circular holes 64 and 70 respectively, the plates 60 and 62 can include holes having any desired shape, such as a square, a triangle, or curved slots. Furthermore, although the holes 64 are the same or substantially the same size and the holes 70 are the same or substantially the same size, the holes 64 can have different sizes and the holes 70 can have different sizes.

Still referring to FIG. 4, in one embodiment, the mount 52 includes mounting plates 76 and 78 for mounting the flow-resistance members 60 and 62, respectively, to the circuit board 40 (FIG. 3). The mounting plates 76 and 78 are flat or substantially flat and parallel or substantially parallel relative to each other. Four screws 88, each located at one of the respective corners 80 and 82 of the mounting plate 76 and at the corners 84 and 86 of the mounting plate 78, attach the fluid-flow balancer 42 to the circuit board 40. Four coil springs 90 each disposed between the head 92 of each screw 88 and the respective one of the corners 80, 82, 84, and 86 urge the heads 92 away from the respective corners. When the screws 88 are attached to the circuit board 48, the springs 92 force the mounting plates 76 and 78 against the standoffs 58 (FIG. 3). In one embodiment, the standoffs 58 are designed such that the plates 76 and 78 have the same or substantially the same height as the processor and power supply, respectively, of the omitted processor/power-supply unit 44 (FIG. 3).

Furthermore, the fluid-flow balancer 42 can be made from conventional metal such as aluminum for providing EMI shielding when the balancer 42 is attached to the circuit board 40 (FIG. 3). In embodiments where shielding is not desired, the fluid-flow balancer 42 can be made from other materials such as conventional plastics.

Still referring to FIG. 4, other embodiments of the fluid-flow balancer 42 are contemplated. For example, the flow-resistance member 50 can include fewer or more than two flow-resistance plates. In addition, the mount 52 can include fewer or more than two mounting plates.

Figure 5:
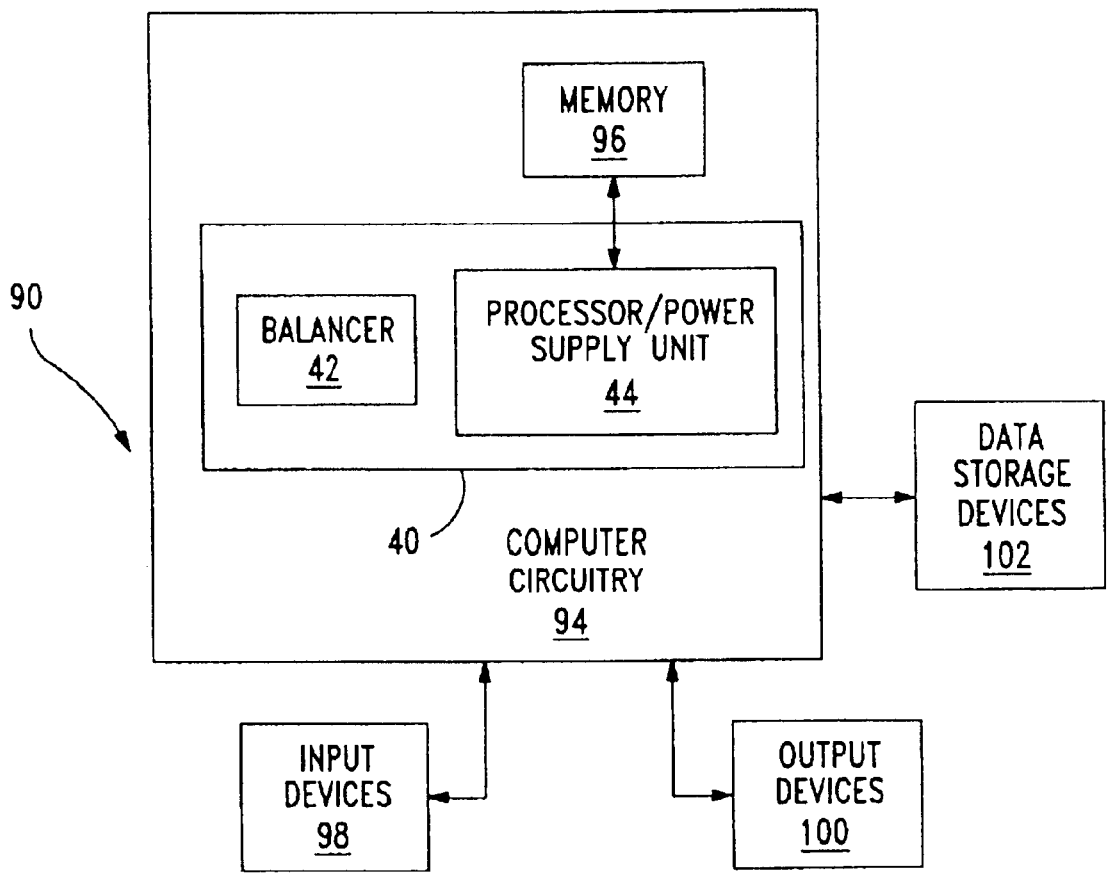
FIG. 5 is a block diagram of an electronic system that includes the circuit board of FIG. 3.

FIG. 5 is a block diagram of an electronic system 90 that incorporates one or more fluid-flow balancers 42 (FIGS. 3 and 4). The system 90 includes computer circuitry 94, which includes the circuit board 40 (FIG. 3) and a memory 96, for performing computer functions such as executing software to perform desired calculations and tasks. The board 40 includes one or more processor/power-supply units 44 coupled to the memory 96, and includes one or more of the balancers 42 in place of omitted processor/power-supply units 44. One or more input devices 98, such as a keyboard, mouse, or microphone, are coupled to the computer circuitry 94 and allow an operator (not shown) to input data thereto. One or more output devices 100 are coupled to the computer circuitry 94 to provide to the operator data generated by the computer circuitry 94. Examples of such output devices 100 include a printer and a video display unit. One or more data-storage devices 102 are coupled to the computer circuitry 94 to store data on or to retrieve data from external storage media (not shown). Examples of such storage devices 102 and the corresponding storage media include drives that accept hard and floppy disks, tape cassettes, and compact disk read-only memories (CD ROMS).

What is claimed:

1. A fluid-flow balancer for taking the place of a component omitted from a location of a system, the component having an air-flow resistance, the balancer comprising:
    a flow-resistance member operable to mimic the air-flow resistance of the component; and
    a mount operable to mount the flow-resistance member in the location of the system from which the component is omitted.

2. The balancer of claim 1 wherein the flow-resistance member and mount are together operable to suppress electromagnetic interference.

3. The balancer of claim 1 wherein the mount is operable to mount the flow-resistance member to a circuit board.

4. The balancer of claim 3 wherein the flow-resistance member extends in a perpendicular or substantially perpendicular direction relative to the circuit board.

5. The balancer of claim 1 wherein the flow-resistance member includes a flat or substantially flat flow-resistance plate.

6. The balancer of claim 1 wherein the flow-resistance member includes a flat or substantially flat flow-resistance plate that includes one or more holes.

7. The balancer of claim 1 wherein the mount includes a flat or substantially flat mounting plate.

8. The balancer of claim 1 wherein:
    the flow-resistance member includes two flat or substantially flat rectangular flow-resistance plates, each including a plurality of holes;
    the mount includes two flat or substantially flat, rectangular mounting plates parallel or substantially parallel to each other; and
    wherein one of the flow-resistance plates is attached to one of the mounting plates and the other flow-resistance plate is attached to the other mounting plate, and each flow-resistance plate extends from one of the respective mounting plates in a perpendicular or substantially perpendicular direction relative to the respective mounting plate.

9. An electronic system comprising:
    a circuit board having an unoccupied region that is designed for occupation by an electronic component; and
    a fluid-flow balancer including a mount mounted to the region of the circuit board and a flow-resistance member extending from the mount and operable to mimic the air-flow resistance of the electronic component.

10. The system of claim 9 wherein the fluid-flow balancer has the same or substantially the same electromagnetic-interference-suppression characteristics as the electronic component.

11. The system of claim 9 wherein:
    the circuit board includes two processing/supply units, and two unoccupied regions each designed for occupation by a processing/supply unit; and
    the fluid-flow balancer is mounted to one of the regions and is operable to provide the same or substantially the same fluid-flow resistance as one of the omitted processing/supply units, and another fluid-flow balancer is mounted to the other region and is operable to provide the same or substantially the same fluid-flow resistance as the other omitted processing/supply unit.

12. An electronic system comprising:
    a circuit board having a region designed for occupation by an omitted electronic component and including a substitute electronic component mounted to the region, wherein the substitute component replaces the omitted component; and
    a fluid-flow balancer including a mount mounted to the region of the circuit board and a flow-resistance member extending from the mount, wherein the combination of the fluid-flow balancer and the substitute component are operable to mimic the air-flow resistance of the omitted electronic component.

13. The system of claim 12 wherein the fluid-flow balancer has the same or substantially the same electromagnetic-interference-suppression characteristics as the omitted electronic component.

14. The system of claim 12 wherein the air-flow resistance of the substitute electronic component is less than the air-flow resistance of the fluid-flow balancer.

15. A method of mimicking the air-flow resistance of an omitted system component, comprising:

mounting a fluid-flow balancer in a region of a system from which the component is omitted; and resisting with the fluid-flow balancer an air flow past the region with the same or approximately the same resistance as the component would provide if present.

16. The method of claim 15 wherein mounting the fluid-flow balancer includes mounting the fluid-flow balancer in a region of the system occupied by a substitute component that is replacing the omitted component.

* * * * *